US007062556B1

(12) United States Patent
Chen et al.

(10) Patent No.: US 7,062,556 B1
(45) Date of Patent: Jun. 13, 2006

(54) LOAD BALANCING METHOD IN A COMMUNICATION NETWORK

(75) Inventors: David T. Chen, Evanston, IL (US); Philip J. Fleming, Glen Ellyn, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/447,400

(22) Filed: Nov. 22, 1999

(51) Int. Cl.
G06F 15/173 (2006.01)
G06F 15/16 (2006.01)

(52) U.S. Cl. .................. 709/226; 709/223; 709/203; 709/201

(58) Field of Classification Search ................ 709/200, 709/201, 203, 223, 226, 228, 229
See application file for complete search history.

(56) References Cited

U.S. PATENT DOCUMENTS

| | | | | |
|---|---|---|---|---|
| 4,894,846 A * | 1/1990 | Fine | ............................ | 370/507 |
| 5,774,668 A * | 6/1998 | Choquier et al. | ............ | 709/223 |
| 5,835,724 A * | 11/1998 | Smith | ...................... | 707/501.1 |
| 5,918,017 A * | 6/1999 | Attanasio et al. | ........... | 709/224 |
| 5,951,694 A * | 9/1999 | Choquier et al. | ............ | 714/15 |
| 6,003,083 A * | 12/1999 | Davies et al. | ............... | 709/226 |
| 6,006,259 A * | 12/1999 | Adelman et al. | ........... | 709/223 |
| 6,078,943 A * | 6/2000 | Yu | ............................. | 709/102 |
| 6,078,960 A * | 6/2000 | Ballard | ....................... | 709/229 |
| 6,119,143 A * | 9/2000 | Dias et al. | .................. | 709/105 |
| 6,128,644 A * | 10/2000 | Nozaki | ....................... | 709/203 |
| 6,195,680 B1 * | 2/2001 | Goldszmidt et al. | ........ | 709/203 |
| 6,249,801 B1 * | 6/2001 | Zisapel et al. | .............. | 718/105 |
| 6,253,230 B1 * | 6/2001 | Couland et al. | ............ | 709/203 |
| 6,324,177 B1 * | 11/2001 | Howes et al. | ............... | 370/389 |
| 6,327,622 B1 * | 12/2001 | Jindal et al. | ................ | 709/228 |
| 6,424,992 B1 * | 7/2002 | Devarakonda et al. | ...... | 709/203 |
| 6,470,394 B1 * | 10/2002 | Bamforth et al. | ........... | 709/241 |
| 6,760,775 B1 * | 7/2004 | Anerousis et al. | .......... | 709/238 |

OTHER PUBLICATIONS

"Classification of Load Distribution Algorithms", Reinhard Riedl and Lutz Richter, Department of Computer Science, University of Zurich, 1996 IEEE.
"Load Distributing for Locally Distributed Systems", Niranjan G. Shivaratri, Phillip Krueger, and Mukesh Singhal, Ohio State University, Dec. 1992.
"The Sprite Network Operating System", John K. Ousterhout, Andrew R. Chereson, Frederick Douglis, Michael N. Nelson, and Brent B. Welch, University of California at Berkeley, Feb. 1988.
"Resource Based Policies for Load Distribution", Kristian Paul Budendorfer, Victoria University of Wellington, Aug. 31, 1996.

* cited by examiner

*Primary Examiner*—Rupal Dharia
*Assistant Examiner*—Kristie D. Shingles
(74) *Attorney, Agent, or Firm*—Sayed Hossain Beladi; Steven A. May

(57) ABSTRACT

A communication system network (500) having a plurality of servers (502-1 through N), each having a load level based on serving a number of clients (501-1 through M), a method includes grouping plurality of servers (502-1 through N) into a plurality of server groups G0 through Gk (503-0 through k) respectively having load levels progressively from a least amount of load level to a most amount of load level, calculating a plurality of time periods T1 through Tk corresponding to the server groups G1 through Gk, assigning load to a server selected from the servers in the server group G0 from an initial time until expiration of the time period T1, after expiration of each of the time periods T1 through Tk measured from the initial time, load assignment takes place by assigning load to a server selected from the servers in the server groups from G0 and and at least one other server group, in server groups G1 through Gk, corresponding to an expiring time period.

13 Claims, 4 Drawing Sheets

LOAD BALANCING METHOD IN A COMMUNICATION NETWORK

RELATED FIELD OF THE INVENTION

The invention relates to the field of communications, and more particularly, to communication load balancing in a communication system.

BACKGROUND OF THE INVENTION

Load balancing attempts to ensure that the workload on each server is within a small degree (or balance criterion) of the workload present on every other servers in the system. Load balancing is an interchangeable term with the term: load sharing. Load sharing is commonly used in situations of sharing the load of a heavily loaded processor with a lightly loaded one. One other term occasionally seen in literature is load leveling. Rather than trying to obtain a strictly even distribution of load across all hosts, or simply utilizing idle hosts, load leveling seeks to avoid congestion on any one host server.

In general, there are immediate advantages of applying load-balancing techniques for communication traffic distribution. One such advantage is reducing the impact of performance of a server when one or more servers fail to function. A network of clients and servers with no load balancing mechanism is likely to exhibit unequal loading among the servers. Some of the servers may be heavily loaded and some other may be lightly loaded or even idle. A failure in a heavily loaded server will cause severe performance degradation. Load balancing significantly reduces such a risk.

In addition, load balancing increases the servers capacity and utilization. Server capacity is often represented by a pre-determined upper limit of available processing capacity in the server. For example, if a server can process in average 100 tasks per unit time, its capacity is normally quoted as 80 tasks per unit time, i.e., 80% of its maximal capacity. This is to leave enough headroom to accommodate load fluctuation. Reducing the load fluctuation in a server is one of the important things of load balancing. If the load variation is carefully controlled with adequate load balancing, the server capacity can be quoted higher, for example, 90% of its maximal capacity. This is a substantial increase over a situation without load balancing.

Moreover, load balancing reduces average system response time. Average response time in a system is the most widely used metric in measuring the efficiency of a load-balancing algorithm. In general, the average system response time in a system with or without load balancing mechanism looks like the graph depicted in FIG. 6. From the graph, it is clear that load balancing can reduce the average system response time, most of the time, in a significant way.

In general, load balancing tries to ensure a fair and balanced resource utilization of the resources at the servers. To a better degree, a well-designed load balancing strategy should seek to avoid any resource idleness when there is enough load in the system to at least lightly load resources. Load balancing activity adds to the cost of a communication system. Load balancing requires processing capacity for computation, communication overhead and memory space to maintain load balancing information. To justify the use of load balancing, the usefulness of each load-balancing step must be weighed against the amount of added processing and communication.

Load balancing improves the performance of a distributed system such as a communication network, usually in terms of response time or resource utilization, by allocating workload amongst a set of cooperating servers connected to the network. The distribution of system load can take place statically or dynamically. A static load balancing may probabilistically or deterministically assign or transfer jobs to servers without consideration of runtime events. This approach is both simple and effective when server workload can be accurately characterized and where the scheduler is in control of all activities, or is at least aware of a consistent background over which it makes its own distribution. Problems arise when the background load is liable to fluctuations, or there are jobs outside the control of the static load distributor. Typical examples of static load distribution are Round Robin, uniform or random distribution, and probabilistic distribution which includes assigning or transferring a request to server i with probability $p_i$, which are pre-determined. Dynamic load balancing is designed to overcome the problems of unknown or uncharacteristic workloads. Dynamic load distribution methods typically monitor server workload for any factors that may affect the choice of the most appropriate assignment and distribute jobs accordingly. Essentially, dynamic algorithms improve performance by exploiting short-term fluctuations in the server (or system) state. However, dynamic algorithms incur more overheads than their static counterparts by collecting, storing, and analyzing state information.

Load balancing schemes are usually partitioned into a policy portion and a mechanism portion. The policy portion includes a set of choices that are made to distribute the load. The mechanism portion carries out the physical distribution of load and provides any information required by the policies. Some common load distribution policy and mechanism include:

Participation Policy: The participation policy determines whether a server will take part in load distribution. It can be as simple as comparing an instance load to a threshold based on the local load, or a more complex security issue such as the refusal of accepting new load due to security concern.

Location Selection Policy: The location policy is responsible for selecting the participating servers between whom the load is distributed. This policy is also responsible for handling the homogeneity or heterogeneity of the participants.

Candidate Selection Policy: The candidate selection policy selects the jobs, process, objects, or whatever the workload unit is, to be distributed.

Transfer Mechanism: The transfer mechanism deals with transferring jobs or processes between servers. This is to allow heavily loaded servers to off-load part of their load (new or existing) to lightly loaded servers. In general, the transfers can be classified into preemptive transfers and non-preemptive transfers. Preemptive transfers involve transferring a partially executed task along with its state (e.g., a virtual memory image, a process control block, unread I/O buffers and messages, file pointers, timer that have been set, etc.) This can be very costly for the communication network traffic. On the other hand, non-preemptive transfers involve only tasks that have not begun execution and hence do not require transferring the information regarding the state of the task.

Performance Feedback Mechanism: The performance feedback mechanism allows the users (clients) to provide performance feedback to the load distribution agents, e.g., the average response time clients experienced. Such feedback may be used to detect unexpected network problems (e.g., the average response time surges) or assist in load distribution decision.

A clearly defined load metric is very important in client/server load distribution scheme, as it represents the workload being distributed. Participation, location and even candidate selections are based on the load, and it is therefore critical that the load metric is relevant. For example, the number of processes on a server may be completely irrelevant load metric as it does not provide any information about the contention for resources on that server. There is a wide variety of possible load metrics. Average Response Time is the most widely used load metric in related load balancing literatures. The response time of a client request is the time elapsed from the initiation of the request to the receiving of a response. Minimizing the average response time is often the goal of load balancing. CPU run queue length has been used for years as an important indicator of system load. Most operating systems provide a mean to calculate the average CPU run queue length over a period of time. For example, the uptime command in UNIX BSD 4.2-and-after can provide the average number of jobs in the run queue over the last 1, 5 and 15 minutes. Buffer Occupancy is another load metric. If servers are equipped with input and output buffers, their occupancy can provide a useful insight of system load.

Some systems simply consider the CPU capacity resource and neglect all others, while others use a more complex combination of resources. Useful load metrics range from instantaneous CPU queue length to a linear combination of CPU, memory and I/O queue lengths. In certain cases, the linear combination of exponentially smoothed CPU, I/O and memory queue lengths produces good performance in load balancing. In other findings, a single resource queue length works as good as a combined load metric. These findings confirm that the load metric is important, but also indicate that the suitability of any load metric depends on the system, workload and load distribution scheme for which it is used.

In a communication network environment, clients and servers communicate through wide area network (WAN) or satellite network, the communication delay has to be considered seriously. In most client/server applications in local area network (LAN) setting, the communication delay can usually be neglected.

If there is a reasonable proportion of idle servers at any time in a system, then these servers represent an immediately allocable resource. The idleness criteria can be fairly simple. For example, an idle host must have had less than one run-able process, averaged over the last minute, and no keyboard or mouse input for the past 30 seconds.

Communication may also be a measure of load, and it is desirable to minimize the communication load between two objects or processes. This encourages the communicating entities to reside together on the same server or close together to minimize the communication cost. Consider two load-balancing strategies. The first policy may be to transfer objects from an over-loaded server to an under-loaded server. The second policy may be to move heavily communicating objects to the same server. The second policy clusters communicating objects, and thus through communication, certain objects express an affinity for each other.

In a homogeneous system where all servers are equally capable in processing client requests, the number of jobs assigned to each server is the most straightforward load metric for load balancing algorithms. This may be the easiest load metric each server can measure. In telephony applications, the number of jobs assigned is simply the number of trunks occupied.

Once the load on a server has been measured, it must be communicated to an agent that makes the load distribution decisions. This poses a difficult problem in most distributed systems because of the cost involved in collection and distribution of the load information. There are also problems of reliability, update delays and even locating the state, any of which can result in out-of-date information being used to make current distribution decisions. A number of solutions have been proposed for load communication, most of which are variations of one of the following methods.

Polling is a message directed at only one server to return its current load. If polling is performed on demand, it results in the most up to date information, but at a potentially high cost. With polling, all potential servers in the system are contacted before each job is scheduled. This could result in the job being delayed while waiting on the other servers to respond, and as the number of job arrivals in the system increases, there will be a corresponding rise in the network traffic.

In a periodic updating method, servers periodically send out load updates to clients, either by broadcast or multicast. Periodic updating is cheaper and fast when checked on the local machine. The major problem is that information can become stale between updates, and result in incorrect job placements A broadcast type method includes a form of undirected communication where all host servers and clients are involved in exchanging information by broadcasting over the network. There are a number of problems with this approach. A broadcast type method may lead to an unacceptable amount of network traffic; in addition, all hosts receive the load updates whether or not the hosts are involved in load distribution. In large networks, there may be a substantial propagation delay over all hosts in the network. The primary advantage is also that all hosts on the network have access to all the broadcast information, and this can be used not only to update recorded server loads on all clients, but also to synchronize a distributed load distribution policy.

In a multicast method, the form of broadcast constrains the members of a group. This reduces some problems associated with the broadcast method, as only members of a certain group receive the load information, but there still may be a lot of traffic. The primary advantage of the group communication system is that identification of participating hosts (clients or servers) is simplified, making the location of suitable sources or destinations a much simpler problem.

A method of central load collection agent can be used to collect and store load information for clients to use. Three typical agents include 1) Global Agent where all servers periodically transmit their loads to a central global collection agent. If there is no change in a server's load from the last period, then no update is sent to the collection agent. The accumulated load vector is then periodically broadcast from the central collection agent to all clients in the system; 2) Central Agent where the system has a central agent, except that the load is not periodically collected or distributed. Instead if a client wishes to send a job or a server wishes to off-load a job, then it sends a request to the central agent. The central agent then replies with a suggested destination. The load information held by the central agent is only updated by the distribution requests; 3) Centex Agent includes a combination of the Global and Central algorithms where a central agent collects all of the periodic load updates, but does not automatically distribute them. If a client (or server) needs to locate a destination, then it contacts the central agent for the most recent information.

There are many load-balancing algorithms that can be found in the prior art literatures. Most of them fall into the dynamic load-balancing category. In general, these algorithms are derived from one of more canonical algorithms. Round Robin and random distribution load balancing perform similarly, providing that the clients distribute requests to servers independently. Round-robin distribution is to have each client distribute traffic load to servers (assuming N servers) 1,2, . . . ,N,1,2, . . . ,N,1,2, . . . ,N in a round-robin way. Random distribution is to have each client distribute traffic load to servers in a uniformly random way. By far, these two are the most common ones. If we assume each server can process an arbitrary number of requests simultaneously, a good rule of thumb at looking at each server's behavior shows the number of requests in each server follows a Poisson distribution. The average number of requests is equal to average request arrival rate divided by average server service rate, which is known as Erlang in telephony. The variance of the number of requests is approximately equal to the average number of requests, and 95% of the time, the number of requests will be bounded between the average +/−2 standard deviations where one standard deviation is equal to a squared root of variance.

Another method is join-the-least-loaded-server. Ideally, join-the-least-loaded-server is the best load balancing method if clients always know the current load of any server. An ideal but unrealistic way is to have each server send out a Load Update message to all clients every time its load changes. This will guarantee that clients always learn the current load of servers and perform a perfect load-balancing job. However, this ideal practice will create lots of control messages and consume lots of valuable network bandwidth. On the other hand, if servers do not update clients of their load frequent enough, a least loaded server based on clients' knowledge could be flooded with all the requests of services and it may be over-loaded before it can broadcast its load to all clients. A key aspect of such method is how to pick a good timing for servers to broadcast their load updates such that clients can have appropriate and accurate information to distribute the requests.

FIG. 1 depicts a logical partitioning of clients and servers in a communication network. For analysis purposes, let's assume there are N clients 101-1 through 101-N, and K servers 111-1 through 111-K. Let's assume, there are more clients than servers (N≧K.) Such assumptions are most prevalent in practical cases. Clients are partitioned into client groups 121-1 through 121-K. Each client group is served by a corresponding server. Each client in a client group sends its jobs to the assigned server respectively as shown through logical connections 131-1 through 131-K. Each server and client group pair can be viewed as an independent queuing system. If assume Poisson arrivals of clients' tasks and exponential, service rate for each server may be calculated using known analysis.

FIG. 2 depicts another logical partitioning of client and servers where there are more servers than clients (N≦K). Servers 211-1 through 211-K are partitioned into server groups 221-1 through 221-N, and each server group serves one client selected from clients 201-1 through 201-N. A First Come First Serve (FCFS) queue is formed at each client and jobs are removed one at a time by any of the available servers in each server group.

FIG. 3 depicts a flow diagram for a sender initiated algorithm that may be used to perform load balancing. In such a sender-initiated algorithm, the focus on load distributing activities initiated by an overloaded server is to send tasks to an under-loaded server. In other words, they fall into the load-sharing category. Over-loaded servers use a threshold (T) based transfer policy to decide at a decision block 302 whether or not a new arriving request 301 should be transferred. The queue length at the over-loaded server is compared to the threshold T at a decision block 302. If the decision at block 302 is to transfer arriving request 301 because the threshold T has been reached, a server "i" is selected at a selector block 303 based on Random or Round Robin method. At a block 304, the server "i" is polled. At a decision block 305, the queue length at the server "i" is compared to a threshold T. If the queue length at the server "i" is smaller than the threshold T, the request is transferred to the server "i" at transfer block 306. If the queue length at the server "i" is larger than the threshold T, a new server "i" is selected at selector block 303, and the process is repeated. At a decision block 307, the number of repeated polls is compared against a number of polls limit. If the number of polls limit has been reached, the process sends the request to a request-locally-block 308 for queuing the request locally.

Such sender-initiated algorithms provide significant performance improvement over systems that offer no load sharing algorithms at all. However, they may cause system instability at high system loads. When the system is heavily loaded, no server is likely to be lightly loaded, so a sender is unlikely to find a suitable destination server to share its load. The polling activity in sender-initiated algorithms increases as the request arrival rate increases. Eventually, the workload that cannot be offloaded from another server, together with the overhead incurred by polling, exceeds the server's processing capacity and results in instability. Unless the sender-initiated algorithms can adapt to the system state, they are not effective at high system loads.

FIG. 4 depicts a flow diagram for a receiver initiated algorithm that may be used to perform load balancing. In receiver-initiated algorithms, load-distributing activities are initiated from an under-loaded server (receiver), which tries to get a request from an overloaded server (sender.) An under-loaded server polls randomly or Round Robin other servers looking for a task transfer. The decisions in sender or receiver are mainly threshold based. At a decision at block 402, a receiver server "j" makes a request 401 for a task transfer. Decision block 402 compares a queue length of request 401 against a threshold T. If the queue length is less than the threshold T, at a block 403, a server "i" is selected based on Random or Round Robin method. At a block 404, the server "i" as a sender server candidate is polled. At a decision block 405, the queue length at the server "i" is compared to a threshold T. If the queue length at the sender server "i" is larger than the threshold T, the request is transferred to the receiver server "j" at transfer block 406. If the queue length at the sender server "i" is smaller than the threshold T, a new sender server "i" is selected at selector block 403, and the process is repeated. At a decision block 407, the number of repeated polls is compared against a number of polls limit. If the number of polls limit has been reached, the process stops at a stop block 408.

If all polls fail to find a sender, then the server should wait until next request departs or for a predetermined period before reinitiating the polling activity if the server "j" is still a receiver server. Such a receiver-initiated algorithm does not cause system instability because even at high system loads a receiver is likely to find a suitable sender within a few polls. Consequently, the number of polls increases as the system load increases. A drawback for such a receiver-initiated algorithm is the cost associated with the preemptive transfer. Most of the time, the polls arrive at senders just after new requests have arrived. At the senders, the newly arrived requests immediately take the CPU run queue. The transfer of a request that is being executed in a preemptive transfer is quite costly on the CPU capacity.

Under symmetrically initiated algorithms, both senders and receivers initiate load-distributing activities for task transfers. These algorithms have both the advantages and disadvantages. Normal implementation of the symmetrically initiated algorithms is to preserve the advantages and use adaptive methods to avoid the disadvantageous outcomes. One drawback for implementing the symmetrically initiated algorithm is that the load distributing activities incur more overhead and computation for both the sender and receiver servers.

A general perception for avoiding load-balancing disadvantages is to use dynamic load balancing algorithms. However, dynamic load balancing algorithms are inevitably more complex which may negate their benefits.

Stability of the load-balancing algorithm is also an important factor to consider. Views of stability include the theoretic queuing perspective and the algorithmic perspective. From the queuing perspective, when the long-term arriving rate of tasks to a system is greater than the rate in which the system can perform work, the system is viewed unstable. For example, if a load-balancing algorithm performs excessive message exchanges to collect system state information, and the arriving load plus the processing overhead incurred by the algorithm exceeds the service capacity of the system, the system will become unstable.

An algorithm is termed unstable if it performs fruitless actions indefinitely with nonzero probability. For example, consider a thrashing process in a heavily loaded system where a task moves indefinitely from one server to another in search for a transfer candidate without ever receiving any service. Such a moving orphan task with its overhead can cause the algorithm to be in the unstable mode.

Most load balancing algorithms require some processing power from a CPU. A good algorithm should try to minimize the calculations involved in load distribution. For example, Round Robin and uniformly random perform similarly, but the random distribution requires more calculation than the Round Robin. It needs to generate a random number and then makes several comparisons to determine a destination. Thus, Round Robin is usually the preferred choice.

A small client/server system sometimes does not justify the need of a sophisticated load-balancing algorithm. A simple static load-balancing algorithm (for example, Round Robin) may simply do the job well. A well-designed load-balancing algorithm should also take the fail-over impact into consideration. The method involves how the algorithm reacts to a sudden server failure, and where shall the load directed on the failed (or failing) server are redistributed. On the other hand, a robust load-balancing algorithm also needs to consider how to accommodate a repaired server in its load distribution.

To consider practical aspects of a load-balancing algorithm, it is essentially important to consider the stability issues, especially for the dynamic load-balancing algorithm. Therefore, there is a need for a load balancing algorithm that overcomes these and other shortcomings in balancing load in a communication system.

DETAILED DESCRIPTION OF THE PREFERRED EMBODIMENT(S)

Figure 1:
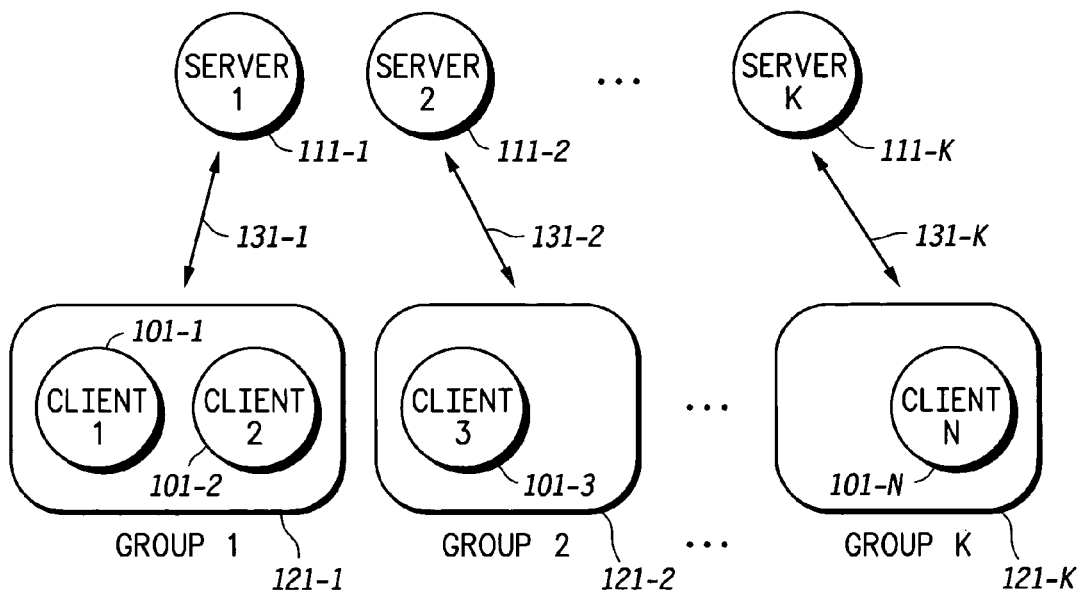
FIG. 1 depicts a logical partitioning of clients and servers in a communication network.
Figure 2:
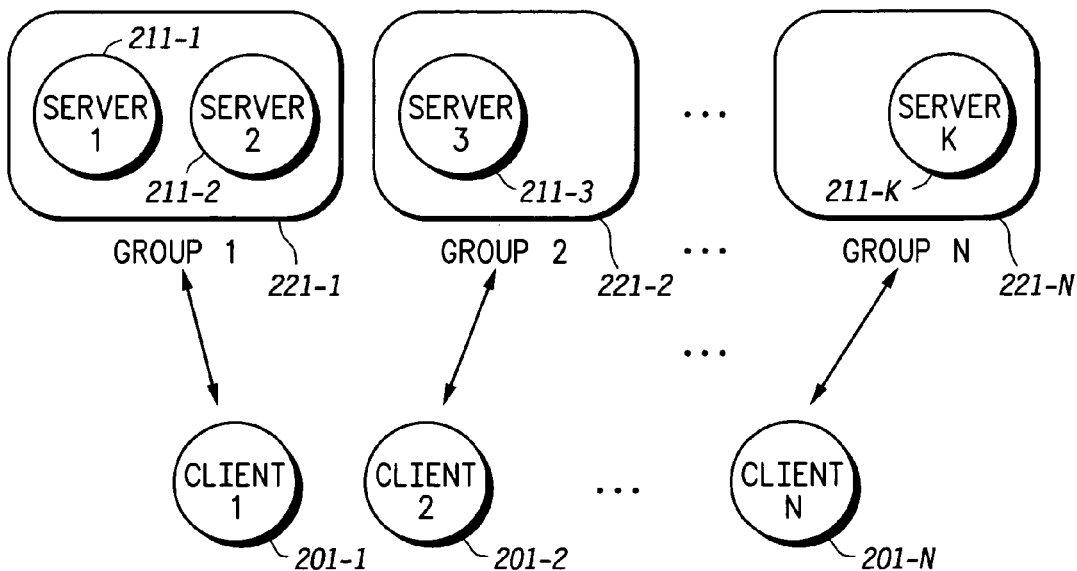
FIG. 2 depicts another logical partitioning of clients and servers where there are more servers than clients.
Figure 3:
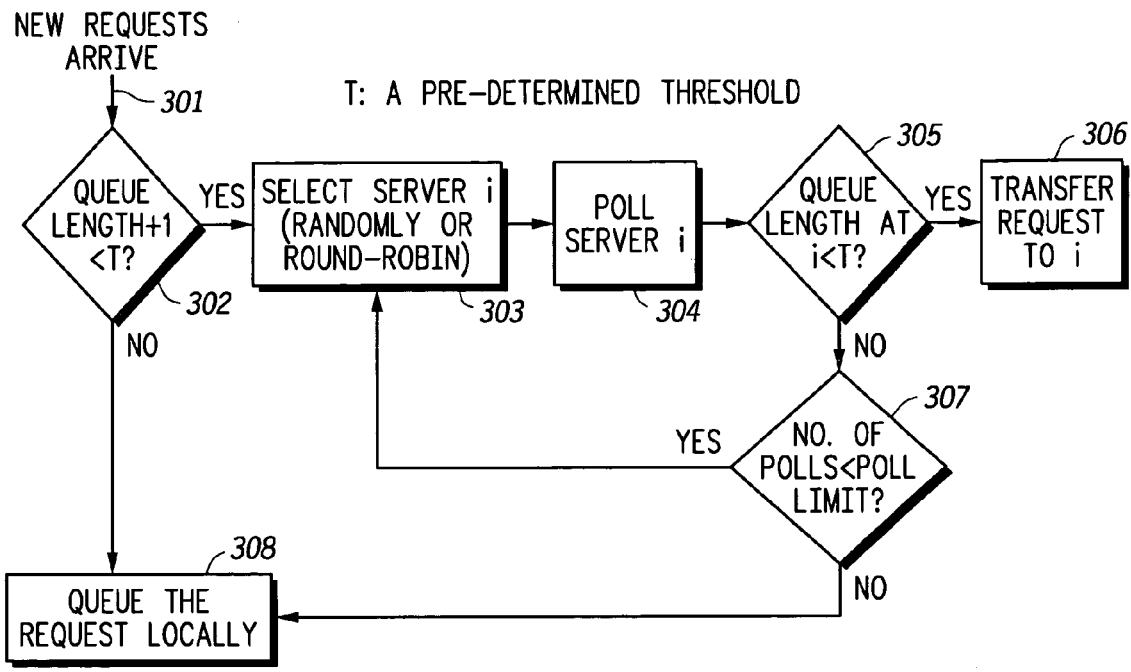
FIG. 3 depicts a flow diagram for a sender initiated algorithm that may be used to perform load balancing.
Figure 4:
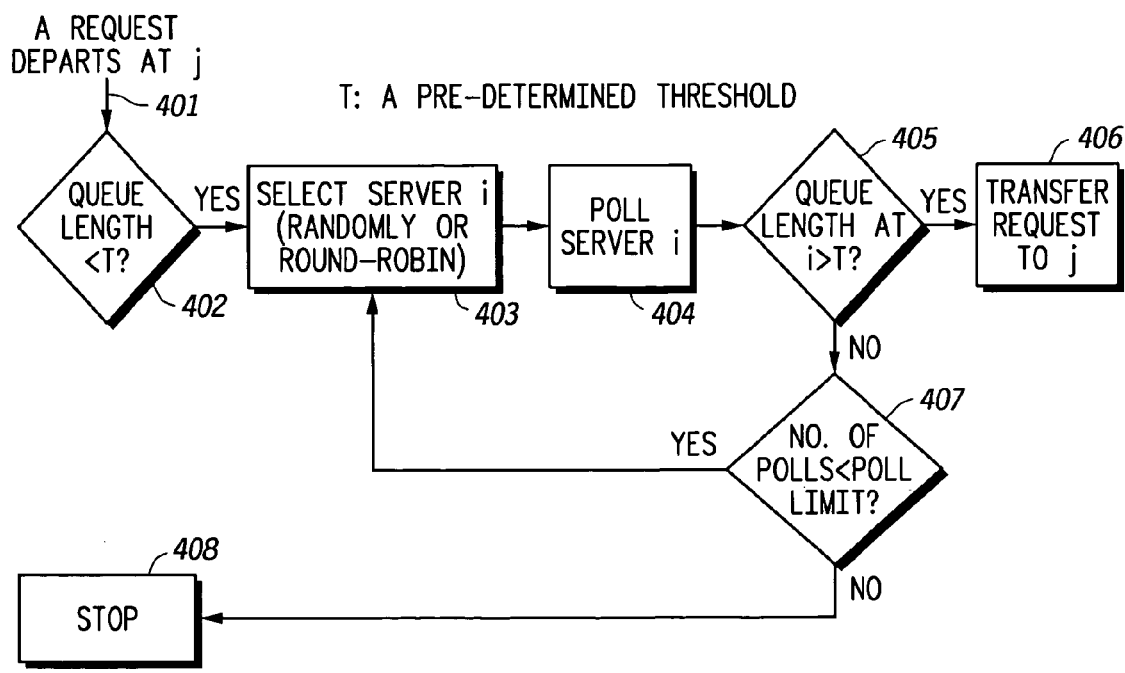
FIG. 4 depicts a flow diagram for a receiver initiated algorithm that may be used to perform load balancing.

Load assignment according to various aspects of the invention solves one or more problems associated with load balancing in a communication network. An embodiment of the invention may be included in a communication system network having a plurality of servers. Each of the plurality of servers may have a load level based on serving a number of clients in the communication system network. A method according to an embodiment of the invention includes grouping the plurality of servers into a first and second server groups, the first server group having a load level less than the load level of the second server group. Load assignment takes place by assigning load to a server selected from the servers in the first server group from an initial time until expiration of a time period T. The time period T may be calculated based on the load level of at least one of the servers. After expiration of the time period T, load assignment takes place by assigning load to a server selected from the servers in the first and second server groups. As a result, load distribution takes place by anticipating a time period T that determines an optimum time for distributing load to a server in either the first group of servers or the first and second groups of the servers. Such an anticipatory load distribution does not have the known problems because it requires very limited communication among the servers. Each client independently may calculate the time period T. The load information at each server is readily available to all clients in a communication network since each server may periodically broadcast its load level information.

In another embodiment of the invention, a communication system network having a plurality of servers where each server has a load level based on serving a number of clients in the communication system network, a method includes grouping the plurality of servers into a plurality of server groups G0 through G2. Server groups G0 through G2 respectively have load levels progressively from a least amount of load level to a most amount of load level. Time periods T1 and T2 are calculated, the time period T2 being longer than the time period T1. Load assignment takes place by assigning load to a server selected from the servers in the server group G0 from an initial time until expiration of the time period T1. Furthermore, after expiration of the time period T1, load assignment takes place by assigning load to a server selected from the servers in the server groups G0 and G1. After expiration of the time period T2, load assignment takes place by assigning load to a server selected from the servers in the server groups G0, G1 and G2.

Generally speaking, in a communication system network having a plurality of servers, each of the plurality of servers having a load level based on serving a number of clients in the communication system network, a method according to an embodiment of the invention includes grouping the plurality of servers into a plurality of server groups G0 through Gk. The server groups G0 through Gk respectively have load levels progressively from a least amount of load level to a most amount of load level, the server group Gk having the most load level larger than the load level of the server groups G0, and larger than any intervening server groups where "k" is larger than two. The intervening server groups have progressively larger load level than the load level of the server group G0. A plurality of time periods T1 through Tk are calculated, the time period Tk being longer than time period T1, and longer than any intervening time periods where k is larger than two. The intervening time periods are progressively longer than time period T1. Load assignment takes place by assigning load to a server selected from the servers in the server group G0 from an initial time until expiration of the time period T1. After expiration of each of the time periods T1 through Tk measured from the initial time, load balancing takes place by assigning load to a server selected from the servers in the server groups including the server group G0 and at least one other server group selected from the server groups G1 through Gk.

Broadly speaking, in a communication system network having a plurality of servers, each of the plurality of servers having a load level based on serving a number of clients in the communication system network, a method according to an embodiment of the invention includes grouping the plurality of servers into a plurality of server groups G0 through Gk. The server groups G0 through Gk respectively have load levels progressively from a least amount of load level to a most amount of load level, the server group Gk having the most load level larger than the load level of the server groups G0, and larger than any intervening server groups where "k" is larger than two. A plurality of time periods T1 through Tk are calculated respectively corresponding to the server groups G1 through Gk. Load assignment takes place by assigning load to a server selected from the servers in the server group G0 from an initial time until expiration of the time period T1. After expiration of each of the time periods T1 through Tk measured from the initial time, load assignment takes place by assigning load to a server selected from the servers in a combination of servers including the server group G0 and at least one other server group, in the server groups G1 through Gk, corresponding to an expiring time period.

According to various aspects of the invention, calculation of each of the plurality of time periods T1 through Tk may be based on a difference between load levels of at least two server groups in the plurality of server groups G0 through Gk. Load level of servers may change depending on the number of clients using the communication network and served by the servers. Calculation of each of the plurality of time periods T1 through Tk may be based on: 1) load levels of at least two server groups selected from the plurality of server groups G1 through Gk, 2) a request arrival rate, and 3) a server service rate, or 4) a combination of 1 through 3. The request arrival rate may be substituted for an average request arrival rate of the plurality of servers, or an average request arrival rate of a combination of servers of the plurality of servers. The server service rate may be substituted for an average service rate of the plurality of servers, or an average service rate of a combination of servers of the plurality of servers.

Each client at different times may place different levels of load on a server or a plurality of servers. For example, a client may be in communication with another source for receiving voice and data at the same time. The load level requirement changes when the data has been transferred to its destination. The number of clients served by the plurality of servers may change which as a result changes the load levels at one or more servers. A new load level information may be received periodically depending on the requirements of the clients. When receiving an update of load level of at least one of the plurality of servers in the plurality of server groups G0 through Gk, the grouping of servers is repeated to produce a new plurality of server groups G0 through Gk based on the update of load level. Calculating the plurality of time periods is repeated to produce a new plurality of time periods T1 through Tk corresponding to the new plurality of server groups G0 through Gk. The initial time is reset to a reset initial time. Load assignment takes place by assigning load to a server selected from the servers in the new server group G0 from the reset initial time until expiration of the new time period T1. After expiration of each of the time periods T1 through Tk measured from the reset initial time, load assignment takes place by assigning load to a server selected from the servers in the server groups exclusively from G0 to the server group that its index corresponds to the index of the expired time period.

According to various aspects of the invention, grouping of the plurality of server groups G0 through Gk may be based on similarity of load levels among the plurality of servers. For example, the servers with similar low load levels may be grouped in the server group G0, and similarly, the servers with similar large load levels grouped in the server group Gk. The servers in each intervening server groups have similar load levels.

According to various aspects of the invention, a round robin selection method or a random selection method may be used for at least one load assignment in assigning load to a server selected from the server group G0. Similarly, a round robin selection method or a random selection method may be used for at least one load assignment to a server selected from servers in the combination of the server groups.

According to the invention, an anticipatory load balancing allows putting load projection intelligence in a client-server environment to route requests of services to groups of least loaded servers based on not only server load updates but also on an intelligent projection time period T which is based on one or more servers loading behavior. Putting projecting capability into client-server environment reduces the frequency of server updates which results in preserving valuable network bandwidth. Improperly managed traffic load distribution in a client-server environment will cause inefficient use of server resources, higher risk of server overload, longer transaction delay, and lower system capacity. According to the invention, the anticipatory load balancing method allows load balancing across all the available servers.

Figure 5:
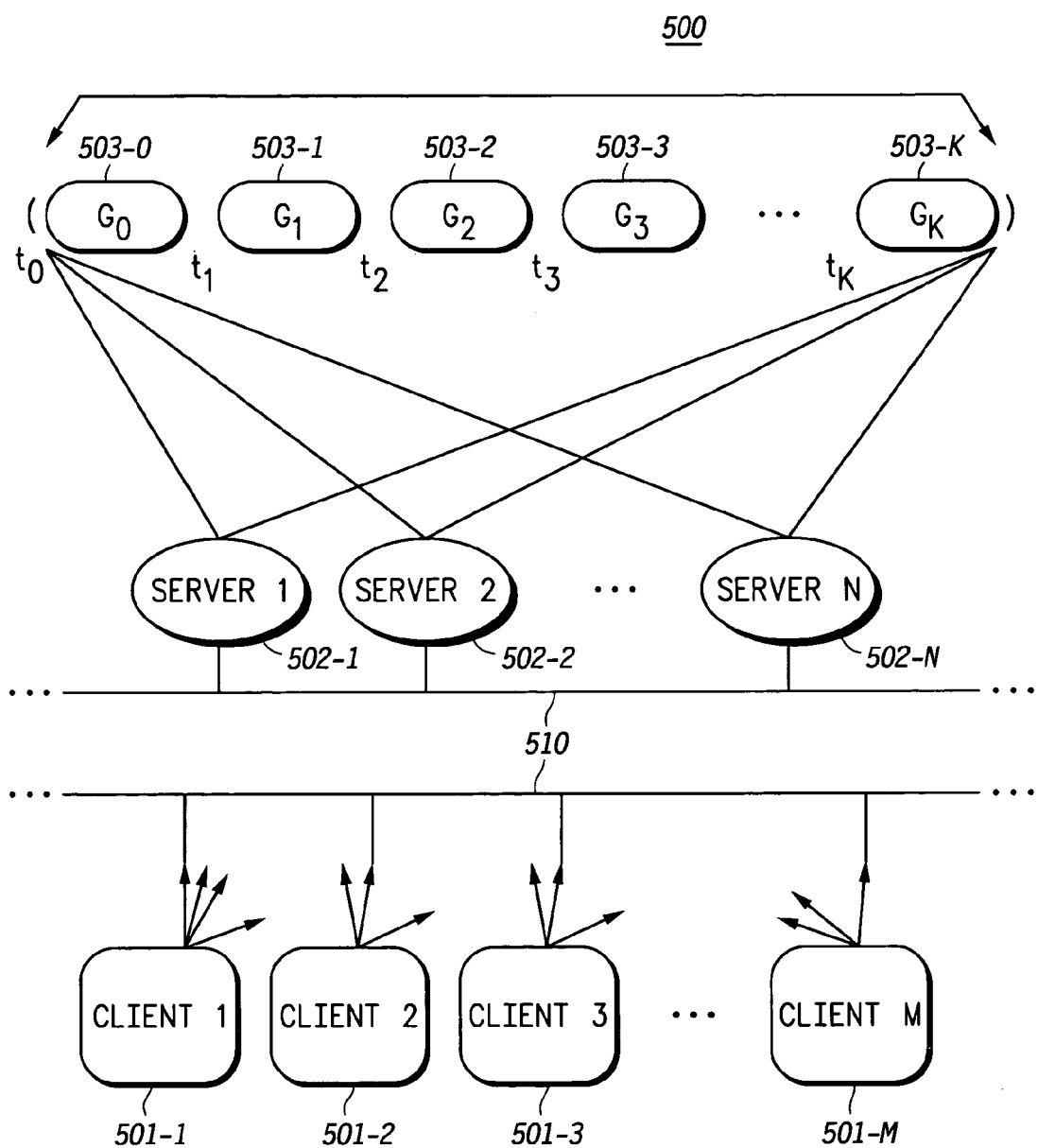
FIG. 5 depicts a communication network with a client/server environment where servers are grouped with corresponding time period for loading change according to various aspects of the invention.
Figure 6:
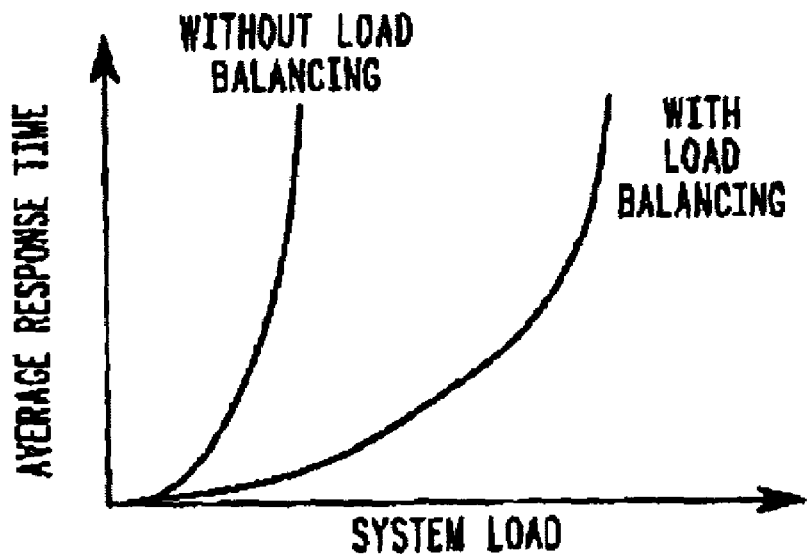
FIG. 6 is a graphical depiction of an average system response time in a system with and without a load balancing mechanism.

Referring to FIG. 5, consider, in a communication network 500, a client-server environment 510 where there are clients 501-1 through M ($C_1, C_2, \ldots, C_M$) and servers 502-1 through N($S_1, S_2, \ldots, S_N$). Each server broadcasts its load periodically to all clients. Each client maintains a server load list. The load list is updated each time a new update from any server arrives. The load in each server is defined to be the total number of requests physically residing in the server, whether they are being served or waiting for service in queues. Based on available server loading information, clients will distribute requests for services to servers according to the invention. The goal for the load balancing is to reduce the load variance in each server as much as possible and ensure a fair and efficient use of server resources.

Broadly speaking, communication system network 500 may have a plurality of servers 502-1 through N each having a load level based on serving a number of clients selected from the clients 501-1 through M. A method according to an embodiment of the invention includes grouping the plurality of servers 502-1 through N into a plurality of server groups 503-0 through 503-k, G0 through Gk. The server groups G0 through Gk respectively have load levels progressively from a least amount of load level to a most amount of load level, the server group Gk having the most load level larger than the load level of the server groups G0, and larger than any intervening server groups where "k" is larger than two. The servers 502-1 through N with similar loads are grouped together to form the server groups 503-0 through k (G0 through Gk.) A plurality of time periods T1 through Tk are calculated respectively corresponding to the server groups G1 through Gk. Load assignment takes place by assigning load to a server selected from the servers in the server group G0 from an initial time until expiration of the time period T1. After expiration of each of the time periods T1 through Tk measured from the initial time, load assignment takes place by assigning load to a server selected from the servers in the server groups exclusively from G0 to the server group that its index corresponds to the index of the expired time period.

Figure 7:
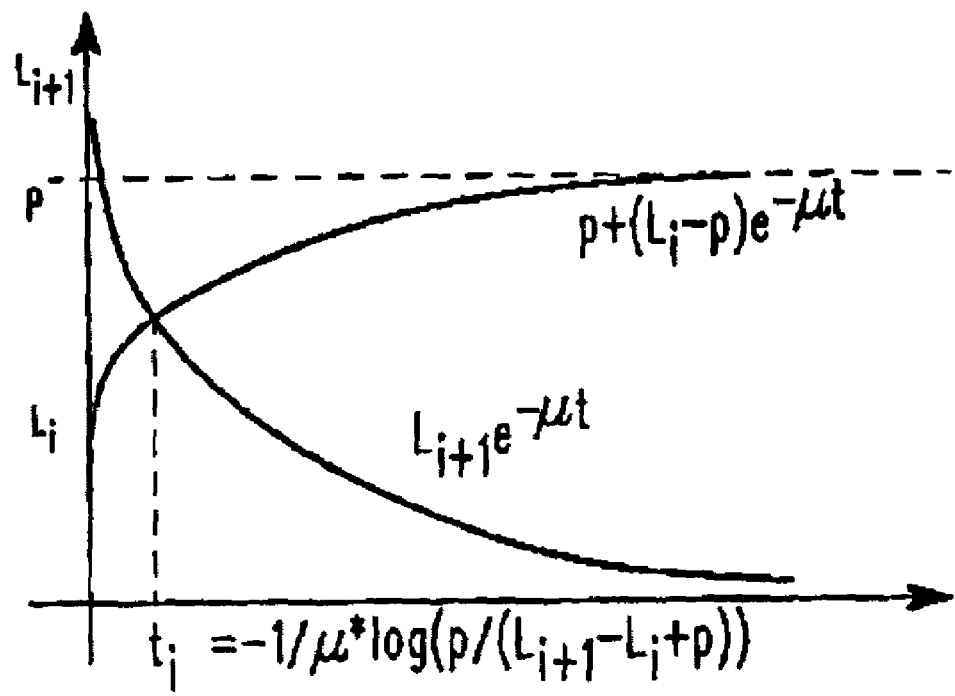
FIG. 7 is a graphical depiction of a determination of a load assignment time period according to an aspect of the present invention.

The calculation of the time period T depends on the knowledge about the server service pattern and client request arrival pattern. The time period T1 through Tk may be calculated either analytically or by approximation. Any of the time periods Ti, where "i" is equal to 1 through "k", may be calculated based on $L_i$, the load level (number of requests) of servers in server group $G_i$, $L_{i+1}$, the load level of servers in $G_{i+1}$, and ($\rho$=(average request arrival rate)/(average server service rate)=$\lambda/\mu$, which results in Ti=$-1/\mu * \log(\rho/(L_{i+1}-L_i+\rho))$. A graphical representation of a determination of the time period is depicted in FIG. 7. The calculation of time period T as shown may change without departing from the main scope of the invention.

What is claimed is:

1. In a communication system network having a plurality of servers, each of said plurality of servers having a load level based on serving a number of clients in said communication system network, a method comprising the steps of:
    grouping said plurality of servers into a plurality of server groups G0 through Gk, wherein said server groups G0 through Gk respectively have load levels from progressively a least amount of load level to a most amount of load level;
    calculating a plurality of time periods T1 through Tk corresponding to said server groups G1 trough Gk;
    assigning load to a server selected from servers in said server group G0 from an initial time until expiration of said time period T1;
    determining a plurality of other groups of servers, wherein each group of servers of said plurality of other groups of servers comprises said group of servers that includes said server group G0 and further comprises at least one other server group selected from said server groups G1 through Gk; and
    assigning load, after expiration of each of said the periods T1 through Tk measured from said initial time, to a server selected from a group of servers of the plurality of other groups of servers, wherein each group of servers of said other groups of servers corresponds to an expiring time period.

2. The method as recited in claim 1 wherein said plurality of time periods T1 through Tk each is based on a difference between load levels of at least two server groups in said plurality of server groups G0 through Gk.

3. The method as recited in claim 1 further comprising the step of:
    receiving an update of load level of at least one of said plurality of servers in said plurality of server groups G0 through Gk;
    repeating said grouping to produce a new plurality of server groups G0 through Gk based on said update of load level;
    repeating said calculating said plurality of time periods to produce a new plurality of time periods T1 through Tk corresponding to said new plurality of server groups G0 through Gk;
    resetting said initial time to a reset initial time, and assigning load to a server selected from servers in said new server group G0 from said reset initial time until expiration of said new time period T1;
    assigning load, after expiration of each of said new time periods T1 through Tk measured from said reset initial time, to a server selected from servers in a combination of servers including said new server group G0 and at least one other server group, in said new server groups G1 through Gk, corresponding to an expiring time period.

4. The method as recited in claim 1 wherein said grouping of said plurality of server groups G0 through Gk is based on similarity of load levels among said plurality of servers.

5. The method as recited in claim 1 wherein at least one load assignment in said assigning load to a server in said server group G0 and said assigning load to a server selected from a group of servers of the plurality of other groups of servers is performed according to a round robin selection method.

6. The method as recited in claim 1 wherein at least one load assignment in said assigning load to a server in said server group G0 and said assigning load to a server selected from a group of servers of the plurality of other groups of servers is performed according to a random selection method.

7. The method as recited in claim 1 wherein each of said plurality of time periods T1 through Tk is based on load levels of at least two server groups selected from said plurality of server groups G0 through Gk, a request arrival rate and a server service rate.

8. The method as recited in claim 7 wherein said request arrival rate is substituted for an average request arrival rate of said plurality of servers.

9. The method as recited in claim 7 wherein said request arrival rate is substituted for an average request arrival rate of a combination of servers of said plurality of servers.

10. The method as recited in claim 7 wherein said server service rate is substituted for an average service rate of said plurality of servers.

11. The method as recited in claim 7 wherein said server service rate is substituted for an average service rate of a combination of servers of said plurality of servers.

12. In a communication system network having a plurality of servers, each of said plurality of servers having a load level based on serving a number of clients in said communication system network, a method comprising the steps of:

grouping said plurality of servers into a plurality of server groups G0 through G2, wherein server groups G0 through G2 respectively have load levels progressively from a least amount of load level to a most amount of load level;

calculating time periods T1 and T2, wherein said time period T2 is longer than said time period T1;

assigning load to a server selected from a group of servers comprising said server group G0 from an initial time until expiration of said time period T1;

determining another group of servers comprising said group of servers that includes said server group G0 and further comprising said serve group G1;

assigning load to a server selected from said another group of servers after expiration of said time period T1;

determining yet another group of servers comprising said group of servers that includes said another group of servers and further comprising said server group G2; and assigning load to a server selected from said yet another group of servers after expiration of said time period T2.

13. In a communication system network having a plurality of servers, each of said plurality of servers having a load level based on serving a number of clients in said communication system network, a method comprising the steps of:

grouping said plurality of servers into a plurality of server groups G0 through Gk, wherein said server groups G0 through Gk respectively have load levels progressively from a least amount of load level to a most amount of load level;

calculating a plurality of time periods T1 through Tk;

assigning load to a server selected from servers in said server group G0 from an initial time until expiration of said time period T1;

determining a plurality of other groups of servers, wherein each group of servers of said plurality of other groups of servers comprises said group of servers that includes said server group G0 and further comprises at least one other server group selected from said server groups G1 through Gk; and assigning load, after expiration of each of said time periods T1 through Tk measured from said initial time, to a server selected from a group of servers of the plurality of other groups of servers.

* * * * *